(12) United States Patent
Asakawa et al.

(10) Patent No.: US 8,115,982 B2
(45) Date of Patent: Feb. 14, 2012

(54) IRIS DIAPHRAGM DEVICE

(75) Inventors: Toshiaki Asakawa, Kitasaku-gun (JP); Shigeyuki Adachi, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 869 days.

(21) Appl. No.: 12/219,758

(22) Filed: Jul. 28, 2008

(65) Prior Publication Data

US 2009/0066834 A1 Mar. 12, 2009

(30) Foreign Application Priority Data

Sep. 6, 2007 (JP) ................................. 2007-231592

(51) Int. Cl.
*G02B 26/02* (2006.01)
(52) U.S. Cl. ........................................ 359/236; 348/363
(58) Field of Classification Search .......... 359/232–234, 359/236, 739; 348/362–368
See application file for complete search history.

(56) References Cited

U.S. PATENT DOCUMENTS
7,665,914 B2 * 2/2010 Chang ........................... 359/739

FOREIGN PATENT DOCUMENTS
WO   WO 2005/026835 A1   3/2005
* cited by examiner

*Primary Examiner* — Euncha Cherry
(74) *Attorney, Agent, or Firm* — Oliff & Berridge, PLC

(57) ABSTRACT

There is provided an iris diaphragm device comprising: two blade members supported on two rotary shafts; a lamp optical path between the two blade members; a motor driving directly one of the rotary shafts; and a means of transmitting power from the one rotary shaft to the other, wherein the motor and the means are disposed off the lamp optical path, and the two blade members revolve respectively to the two rotary shafts whereby a blocked area of the lamp optical path is adjusted, and wherein a magnetic sensor including a plate-like magnetic sensing portion and a plate-like magnet and detecting a rotation angle of the rotary shafts is disposed on an axis line of one of the two rotary shafts and also off the lamp optical path such that facing surfaces of the magnetic detecting portion and the magnet are orthogonal to the rotary shafts.

4 Claims, 4 Drawing Sheets

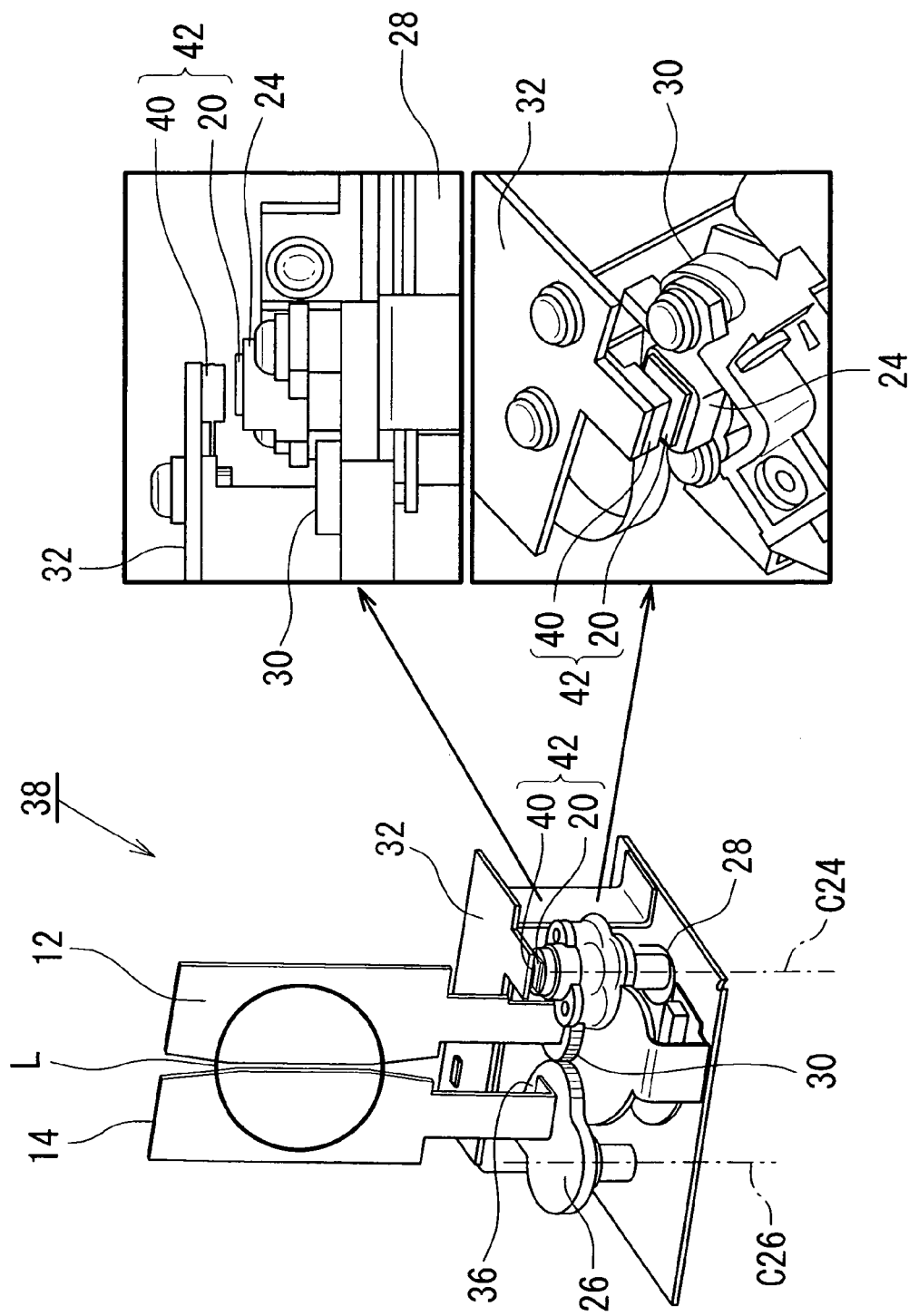

IRIS DIAPHRAGM DEVICE

BACKGROUND OF THE INVENTION

1. Field of the Invention

The present invention relates to an iris diaphragm device for use in a projection high definition television (HDTV) system or in a video projector.

2. Description of the Related Art

In a projection high definition television (HDTV) system or a video projector, generally, a lamp with a high intensity is used as a light source and the amount of light is reduced as required, so that the brightness of a display image can be adjusted according to use environment. If an electric power applied to the lamp is reduced to 70% of the rated power or below in order to reduce the light amount of the lamp, the life of the lamp is shortened. So, an iris diaphragm device to mechanically block the light from the lamp is widely used so that the light amount of the lamp can be reduced to a desired level without shortening the life of the lamp. Included in such iris diaphragm devices are: a slide mechanism type in which two diaphragm blades are provided to slide parallel to each other and the blocked area of the lamp optical path is adjusted according to the change of the overlapping area of the two diaphragm blades; and a rotary mechanism type in which two diaphragm blades supported respectively on two parallel rotary shafts to rotate synchronously with each other are caused to revolve with respect to the respective rotary shafts and the blocked area of the lamp optical path defined between the two diaphragm blades is adjusted by the two diaphragm blades revolving with respect to the respective rotary shafts (refer to, for example, Patent Document WO2005-026835).

In the iris diaphragm devices as described above, it is essential to control the opening between the two diaphragm blades at a high speed and also with a high accuracy to thereby assure a rapid response to image scene change. In the rotary mechanism type iris diaphragm device, since the opening between the two diaphragm blades is adjusted according to the rotation angle of the rotary shafts of the two diaphragm blades, a magnetic sensor is provided which precisely measures the rotation angle of the two rotary shafts and precisely controls the rotation angle of a motor.

FIGS. 3 and 4 show the structure of the relevant portions of diaphragm blades 112 and 114 of a conventional rotary mechanism type iris diaphragm device 10. In an example of FIG. 3, a magnetic sensor 16 includes a Hall effect device 18 as a plate-like magnetic sensing portion. A magnet 20 as a sensed portion is fixed to a side wall of a yoke 22 having a square C shape cross section, and a facing surface 18a of the Hall effect device 18 and a facing surface 20a of the magnet 20 are arranged parallel to an axis line 24C or 26C of the rotary shafts of the diaphragm blades 112 and 114 as shown in FIG. 4A and 4B thus forming a "vertical composition".

The yoke 22 is fixed to either a rotating portion of a motor 28 or a portion (specifically, a gearwheel fixed to a motor rotary shaft in the example shown in the figure) 30 rotary-driven directly by the motor rotary shaft, the diaphragm blade 112 also is fixedly attached to the aforementioned gearwheel 30, and therefore the rotation angle change of the rotary shaft of the diaphragm blade 112 coincides with the angle change of the facing surface 20a of the magnet 20. On the other hand, since the Hall effect device 18 is mounted on a circuit board 32, and the circuit board 32 is fixed to a supporting member such as a bracket, the angle of the facing surface 18a of the Hall effect device 18 does not change if the diaphragm blades 112 and 114 revolve. The revolution angle of the diaphragm blades 112 and 114 can be figured out based on the fundamental principle of the Hall effect device 18 that only a magnetic field component perpendicular to the device surface (the facing surface 18a) is sensed and that an output voltage of a value corresponding to the strength of the magnetic field sensed is generated.

In this connection, since the gearwheel 30 meshes with a gearwheel 36 fixed to a rotary shaft 26 of the diaphragm blade 114, the power of the motor 30 is transmitted to the rotary shaft 26 via the gearwheels 30 and 36, and the diaphragm blades 112 and 114 are caused to revolve synchronously with each other. The magnetic sensor 16, the circuit board 32 and the gearwheels 30 and 36 are located so as not to interfere with a lamp optical path L.

In the rotary mechanism type iris diaphragm device 10 described above, the two diaphragm blades 112 and 114 are supported respectively on the two parallel rotary shafts adapted to rotate synchronously and revolve with respect to the axis lines C24 and C26 of the rotary shafts, whereby the blocked area of the lamp optical path L located between the two diaphragm blades 112 and 114 and oriented orthogonal to the axis lines C24 and C26 can be adjusted, but since the area influenced by the heat and light from the lamp light is larger than the area of the lamp optical path L defined, it can happen that the Hall effect device 18 and the circuit board 32 are deteriorated by the heat and the light. Also, the magnet 20, in order to reduce the influence of thermal demagnetization, is inevitably forced to be expensive. And, the heat deterioration of the Hall effect device 18 and the magnet 20 makes it difficult to prevent deterioration of the angle detection accuracy.

SUMMARY OF THE INVENTION

The present invention has been made in light of the problems described above and has an object to provide a rotary mechanism type iris diaphragm device to mechanically block light from a lamp, which is adapted to be used in a projection high definition television (HDTV) system or in a video projector, and in which the angle of diaphragm blades to reduce light can be precisely figured out and the operation accuracy of the diaphragm blades is enhanced.

The following aspect of the Invention is for the purpose of illustrating a composition of the present invention and explains item by item to facilitate understanding of diversified compositions according to the present invention. Each of the items is not intended to limit the technical range of the present invention but any modification or variation by substituting or removing a part of constituent elements in each item or by adding other constituent elements in consideration of the best mode for carrying out the Invention may be included in the technical range of the present invention.

According to a first aspect of the present invention, an iris diaphragm device is provided in which two blade members are supported respectively on two parallel rotary shafts, a lamp optical path is defined between the two blade members, a motor for driving directly one of the two rotary shafts and a means of transmitting power from the one rotary shaft to the other rotary shaft are disposed off the lamp optical path, and in which the two blade members revolve respectively with respect to the two rotary shafts whereby a blocked area of the lamp optical path is adjusted, wherein a magnetic sensor which includes a plate-like magnetic sensing portion and a plate-like magnet and which detects a rotation angle of the rotary shafts is disposed on an axis line of one of the two rotary shafts and also off the lamp optical path such that facing surfaces of both the magnetic detecting portion and the magnet are oriented orthogonal to the rotary shafts.

In the iris diaphragm device described above, since the plate-like magnetic sensing portion and the plate-like magnet of the magnetic sensor are located on the axis line of the one of the rotary shafts and also located off the lamp optical path with their respective facing surfaces oriented orthogonal to the rotary shafts, both the plate-like magnetic sensing portion and the plate-like magnet are located way off the lamp optical path and kept free from influence of heat and light from a lamp light. Also, since the side surfaces of the plate-like magnetic sensing portion and the plate-like magnet are located to face the lamp light, the area illuminated (projected area) by the lamp light (or light partly diffused from the lamp light) is considerably reduced. Accordingly, the magnetic sensing portion and a circuit board are prevented from deteriorating due to the heat and light, and the deterioration of the circuit board attributable to ultraviolet light contained in the lamp light and having a high energy can be avoided. Thus, the magnetic sensing portion and the magnet can be prevented from deteriorating due to the heat and light, and the deterioration of the angle detection accuracy of the magnetic sensor can be prevented. Further, the magnet is suppressed from being influenced by the thermal demagnetization, and an intended magnetic force can be maintained for a long period of time even if an expensive magnet is not used for the magnet.

In the first aspect of the present invention, the magnet is fixed by a resin adhesive to a rotating portion of the motor, and the magnetic sensor is disposed over the magnet.

Since the magnet is adhesively fixed to the rotating portion of a motor, and at the same time the magnetic sensing portion is disposed over the magnet, the ultraviolet light contained in the lamp light and having a high energy is adequately suppressed from affecting the resin adhesive.

In the first aspect of the present invention, the magnet is fixed by a resin adhesive to one of gearwheels provided respectively with the two rotary shafts and functioning as a power transmitting means, and the magnetic sensor is disposed over the magnet.

Since the magnet is adhesively fixed to the gearwheel for revolving synchronously the two blade members, and at the same time the magnetic sensing portion is disposed over the magnet, the ultraviolet light contained in the lamp light and having a high energy is adequately suppressed from affecting the resin adhesive.

In the iris diaphragm device described above, the magnetic sensing portion is an MR sensor.

The iris diaphragm device uses an MR sensor as the magnetic sensing portion thereby precisely figuring out the angle of the blade members. The MR sensor utilizes an element characterized to change its resistance value according to the intensity and the direction of the magnetic field oriented parallel to the constituent element of the MR sensor, and thereby is adapted to detect the angle of the blade members based on an output voltage changing according to angle variation, thus the MR sensor is enabled to be highly sensitive in a low magnetic field, to have excellent temperature characteristics, to operate at a wide temperature range, and to respond at a high speed.

BRIEF DESCRIPTION OF THE DRAWINGS

FIG. 1 is a perspective view of an iris diaphragm device according to an embodiment of the present invention together with enlarged views of relevant portions of the iris diaphragm device;

DETAILED DESCRIPTION OF THE PREFERRED EMBODIMENTS

Figure 2A:
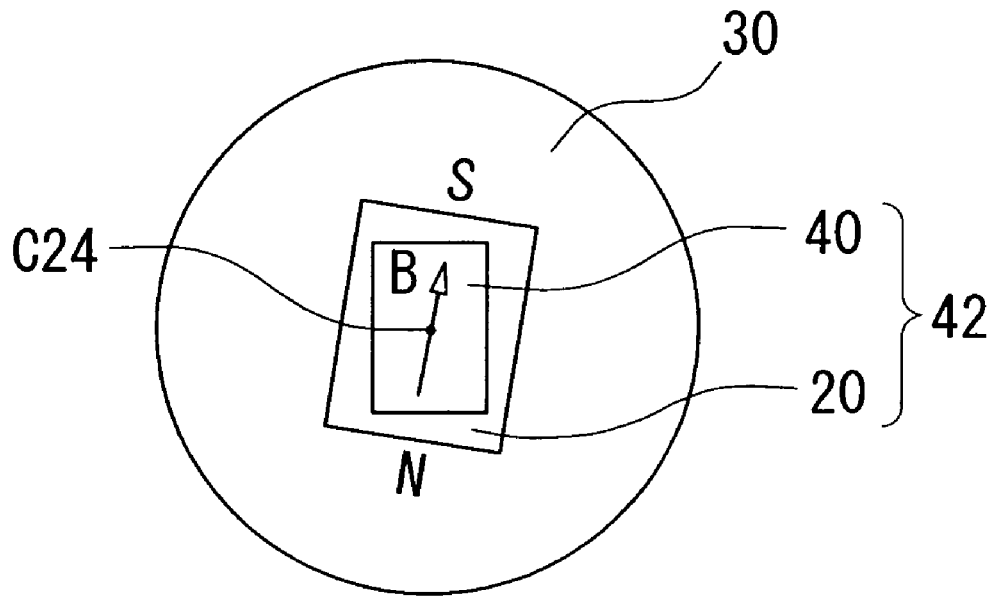
FIG. 2A is a top plan view of a magnetic sensor of the iris diaphragm device of FIG. 1.

An embodiment of the present invention will be described with reference to the accompanying drawings. In explaining the embodiment, any portions identical with or corresponding to those of the conventional art are denoted by the same reference numerals, and a detailed description thereof will be omitted.

Figure 2B:
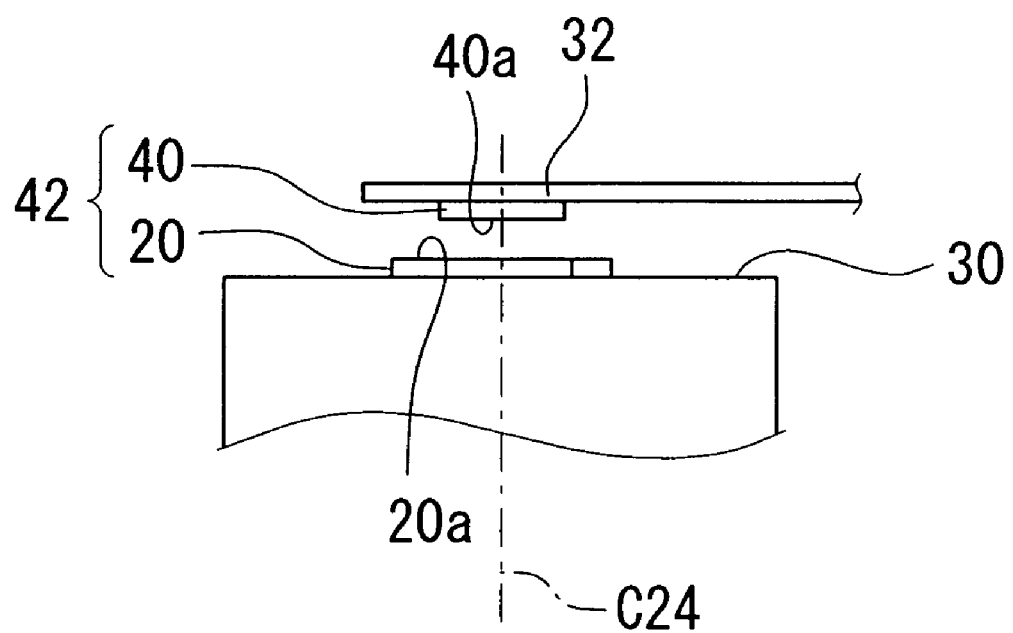
FIG. 2B is a front elevation view of the magnetic sensor of FIG. 2A.

FIGS. 1, 2A and 2B show the structure of the relevant portions of blade members (as diaphragm blades) 12 and 14 of a rotary mechanism type iris diaphragm device 38 according to the embodiment of the present invention. A magnetic sensor 42 includes a plate-like MR sensor 40 used as a magnetic sensing portion and a plate-like magnet 20 fixed on the upper surface of a gearwheel 30, and the MR sensor 40 is disposed over the magnet 20. That is to say, as shown in FIG. 2B, a facing surface 40a of the MR sensor 40 and a facing surface 20a of the magnet 20 are located on an axis line 24C of the rotary shafts of the blade members 12 and 14 and are oriented orthogonal to the axis lines 24C and 26C thus constituting a "horizontal composition". In this connection, S and N in FIG. 2A indicate the magnetic poles of the magnet 20, and an arrow B in the figure indicates the direction of a magnetic field generated by the magnet 20.

A circuit board 32, on which the MR sensor 40 is mounted, is located off a lamp optical path L, oriented orthogonal to the axis lines 24C and 26C of the rotary shafts of the blade members 12 and 14, and has a portion thereof protruding as an area for attachment of the MR sensor 40. Since a motor 28 is a voice coil motor excellent in high speed controllability and enables the blade members 12 and 14 to act fast, the contrast can be rapidly adjusted in response to the image scene change.

According to the above described structure of the embodiment of the present invention, the following advantages can be achieved. First, in the iris diaphragm device 38 according to the embodiment of the present invention, since the magnetic sensing portion 40 and the magnet 20 of the magnetic sensor 42 are disposed to be located on the axis line C24 of the rotary shaft 24 and also located off the lamp optical path L with their respective facing surfaces 40a and 20a oriented orthogonal to the axis line C24 of the blade member 12, both the magnetic sensing portion 40 and the magnet 20 are adapted to be positioned so as to be substantially deviated (about 20 mm compared to, for example, a case of the "vertical composition" arrangement) from the lamp optical path L, which results in that the magnetic sensing portion 40 and the magnet 20 are kept free from the influence of the heat and light coming from the lamp light. Also, since the side surfaces of both the plate-like magnetic sensing portion 40 and the plate-like magnet 20 are located to face the lamp light, the area illuminated (projected area) by the lamp light (or light partly diffused from the lamp light) is considerably reduced.

Figure 3:
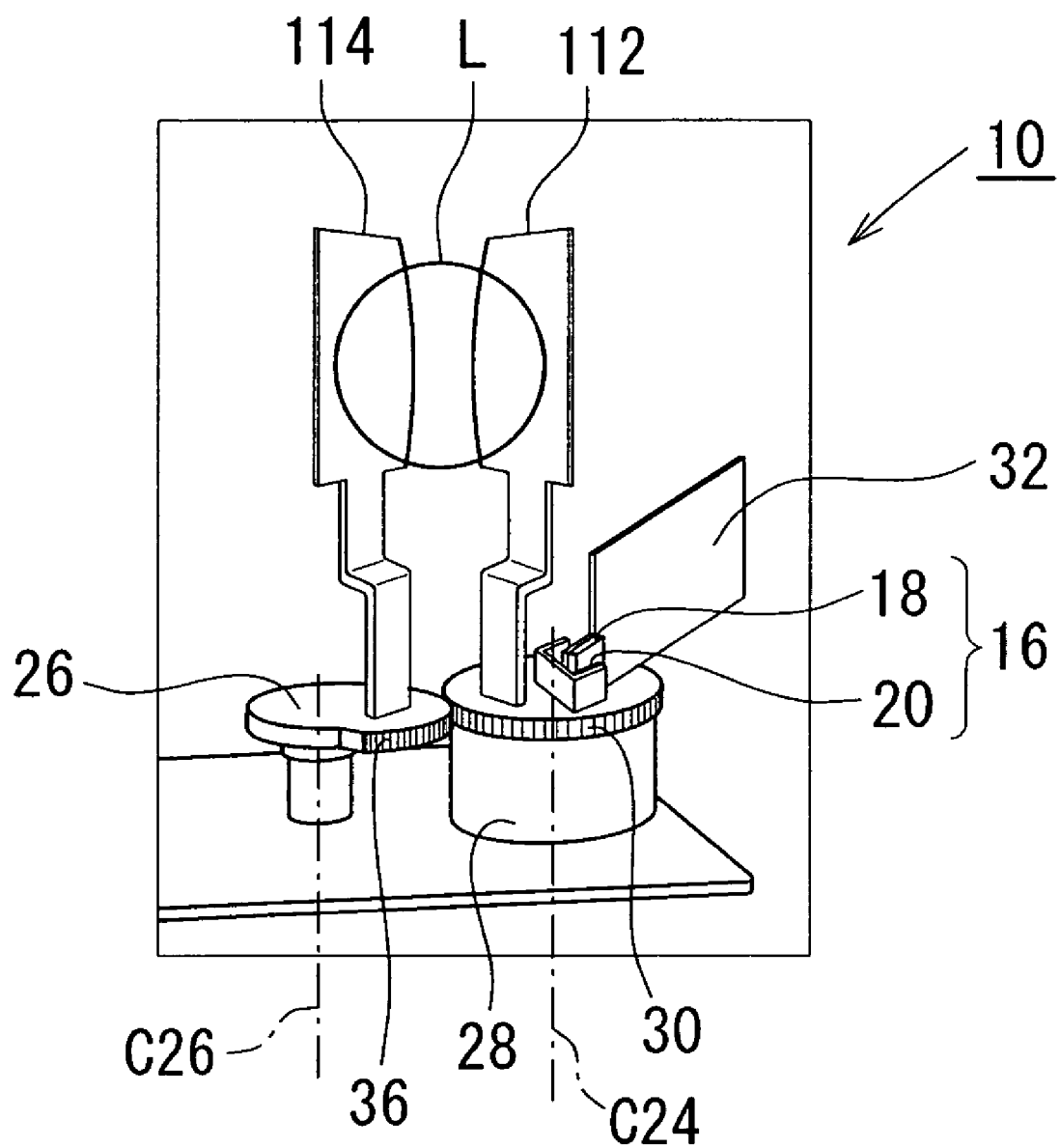
FIG. 3 is a perspective view of a conventional iris diaphragm device.
Figure 4A:
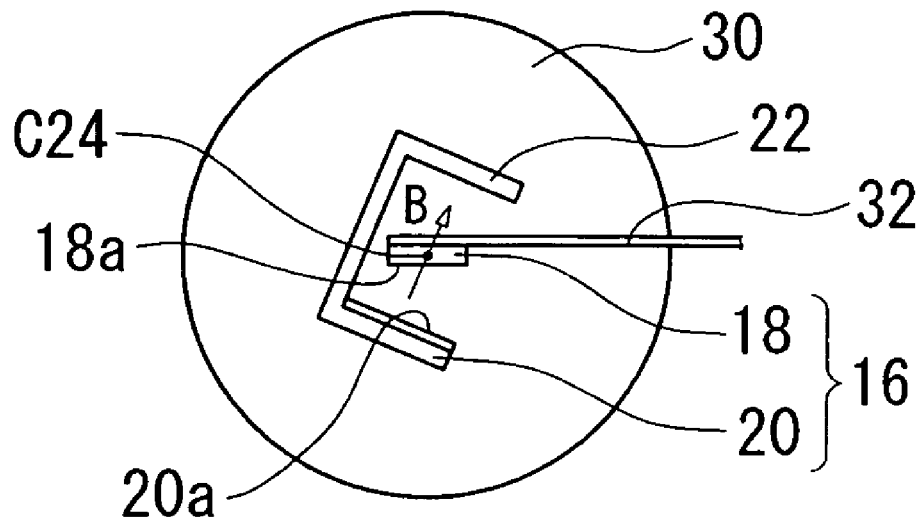
FIG. 4A is a top plan view of a magnetic sensor of the iris diaphragm device of FIG. 3.
Figure 4B:
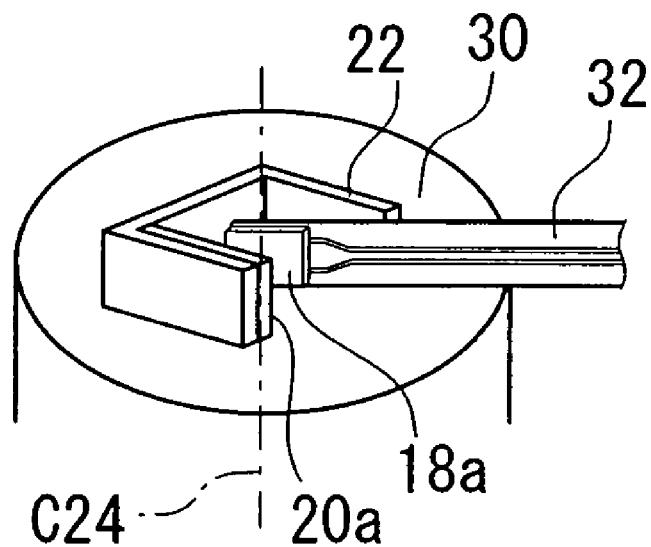
FIG. 4B is a perspective view of the magnetic sensor of FIG. 4A.

Accordingly, the magnetic sensing portion 40 and the circuit board 32 are prevented from deteriorating due to heat and light, and the deterioration of the circuit board 32 attributable to ultraviolet light contained in the lamp light and having a high energy can be avoided. Also, the deterioration of the angle detection accuracy of the magnetic sensor 42 can be prevented. It is confirmed by the inventors, et al. that the temperature of the magnetic sensor 42 is lowered from 100 degrees C. to 80 degrees C. compared with the conventional art (FIG. 3). Thus, the magnet 20 is suppressed from being influenced by the thermal demagnetization, and an intended magnetic force can be maintained for a long period of time even if an expensive magnet is not used for the magnet 20.

Also, since the magnet 20 is fixed by a resin adhesive to the gearwheel 30 adapted to synchronously rotate the two rotary shafts 24 and 26 and also is disposed so as to be covered under the magnetic sensing portion 40, ultraviolet light contained in the lamp light and having a high energy is adequately blocked from affecting the resin adhesive. In this connection, the magnet 20 may be fixed directly to the rotating portion of the motor 28, or alternatively may be fixed to the gearwheel 36 which makes a pair with the gearwheel 30, when necessary.

Also, in the iris diaphragm device 40 according to the embodiment of the present invention, the MR sensor 40 is used as the magnetic sensing portion of the magnetic sensor 42, and consequently the angle of the blade members 12 and 24 can be figured out accurately. The MR sensor 40 utilizes an element characterized to change its resistance value according to the intensity and the direction of the magnetic field oriented parallel to the constituent element of the MR sensor 40, and thereby is adapted to detect the angle of the blade members 12 and 14 based on an output voltage changing according to angle variation ($Tan^{-1}$ is calculated from Sin/Cos wave of the output voltage), thus the MR sensor 40 is enabled to be highly sensitive in a low magnetic field, to have excellent temperature characteristics, to operate at a wide temperature range, and to respond at a high speed. Also, the MR sensor 40 can reduce the precision error in the angle detection with respect to assembly accuracy and temperature change compared with the Hall effect device 18. Further, it can be understood that a magnetic sensor of "horizontal composition" structured as needed by using the Hall effect device 18 also is capable of preventing the deterioration of the magnetic sensing portion 40 and the magnet 20 due to heat and light and also preventing the degradation of the angle detection accuracy.

What is claimed is:

1. An iris diaphragm device comprising:
   two blade members supported respectively on two parallel rotary shafts;
   a lamp optical path defined between the two blade members;
   a motor driving directly one of the two rotary shafts; and
   a means of transmitting power from the one rotary shaft to the other rotary shaft,
   wherein the motor and the means are disposed off the lamp optical path, and the two blade members revolve respectively with respect to the two rotary shafts whereby a blocked area of the lamp optical path is adjusted, and
   wherein a magnetic sensor which includes a plate-like magnetic sensing portion and a plate-like magnet and which detects a rotation angle of the rotary shafts is disposed on an axis line of one of the two rotary shafts and also off the lamp optical path such that facing surfaces of both the magnetic detecting portion and the magnet are oriented orthogonal to the rotary shafts.

2. An iris diaphragm device as described in claim 1, wherein the magnet is fixed by a resin adhesive to either a rotating portion of the motor or one of gearwheels provided respectively with the two rotary shafts, and the magnetic sensor is disposed over the magnet.

3. An iris diaphragm device as described in claim 1, wherein the magnetic sensing portion is an MR sensor.

4. An iris diaphragm device as described in claim 2, wherein the magnetic sensing portion is an MR sensor.

* * * * *